(12) United States Patent
Hogan et al.

(10) Patent No.: US 9,296,832 B2
(45) Date of Patent: Mar. 29, 2016

(54) ANIONIC POLYMERIZATION METHODS FOR PRODUCING FUNCTIONALIZED POLYMERS

(75) Inventors: Terrence E. Hogan, Uniontown, OH (US); Maria E. Uhall, Uniontown, OH (US); William L. Hergenrother, Akron, OH (US); Kenji Nakatani, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 885 days.

(21) Appl. No.: 13/511,809

(22) PCT Filed: Nov. 24, 2010

(86) PCT No.: PCT/US2010/058027
§ 371 (c)(1),
(2), (4) Date: Oct. 15, 2012

(87) PCT Pub. No.: WO2011/066405
PCT Pub. Date: Jun. 3, 2011

(65) Prior Publication Data
US 2013/0030133 A1 Jan. 31, 2013

Related U.S. Application Data

(60) Provisional application No. 61/264,279, filed on Nov. 25, 2009.

(51) Int. Cl.
*C08C 1/00* (2006.01)
*C08C 19/44* (2006.01)
*B60C 1/00* (2006.01)
*C08F 36/04* (2006.01)

(52) U.S. Cl.
CPC . *C08C 19/44* (2013.01); *B60C 1/00* (2013.01); *C08F 36/04* (2013.01)

(58) Field of Classification Search
None
See application file for complete search history.

(56) References Cited

U.S. PATENT DOCUMENTS

| 3,832,423 A | * | 8/1974 | Milkovich et al. | 525/286 |
| 5,786,441 A | * | 7/1998 | Lawson et al. | 528/229 |
| 2006/0030657 A1 | | 2/2006 | Hogan et al. | |
| 2006/0264590 A1 | * | 11/2006 | Hogan et al. | 526/222 |
| 2008/0004385 A1 | * | 1/2008 | Hogan et al. | 524/300 |

FOREIGN PATENT DOCUMENTS

EP  0693505 A1  1/1996

OTHER PUBLICATIONS

Hirao, Akira et al., "Recent advance in living anionic polymerization of functionalized styrene derivatives," Prog. Polym. Sci., vol. 27, pp. 1399-1471 (2002).
Quirk, Roderic P. et al., "Anionic synthesis of chain-end functionalized polymers using 1,1-diphenylethylene derivatives. Preparation of 4-hydroxyphenyl-terminated polystyrenes," Makromol. Chem., vol. 190, pp. 487-493 (1989).
Hofler, Thomas, Feb. 1, 2011 International Search Report with Written Opinion (10 pp.).

\* cited by examiner

*Primary Examiner* — Robert C Boyle
(74) *Attorney, Agent, or Firm* — Meredith E. Hooker

(57) ABSTRACT

A process for producing functional polymer, the process comprising the steps of reacting an anionic initiator including a functional group with a stabilizing monomer to produce a stabilized initiator, reacting the stabilized initiator with monomer capable of being anionically polymerized to produce a polymer, and terminating the polymer.

16 Claims, 1 Drawing Sheet

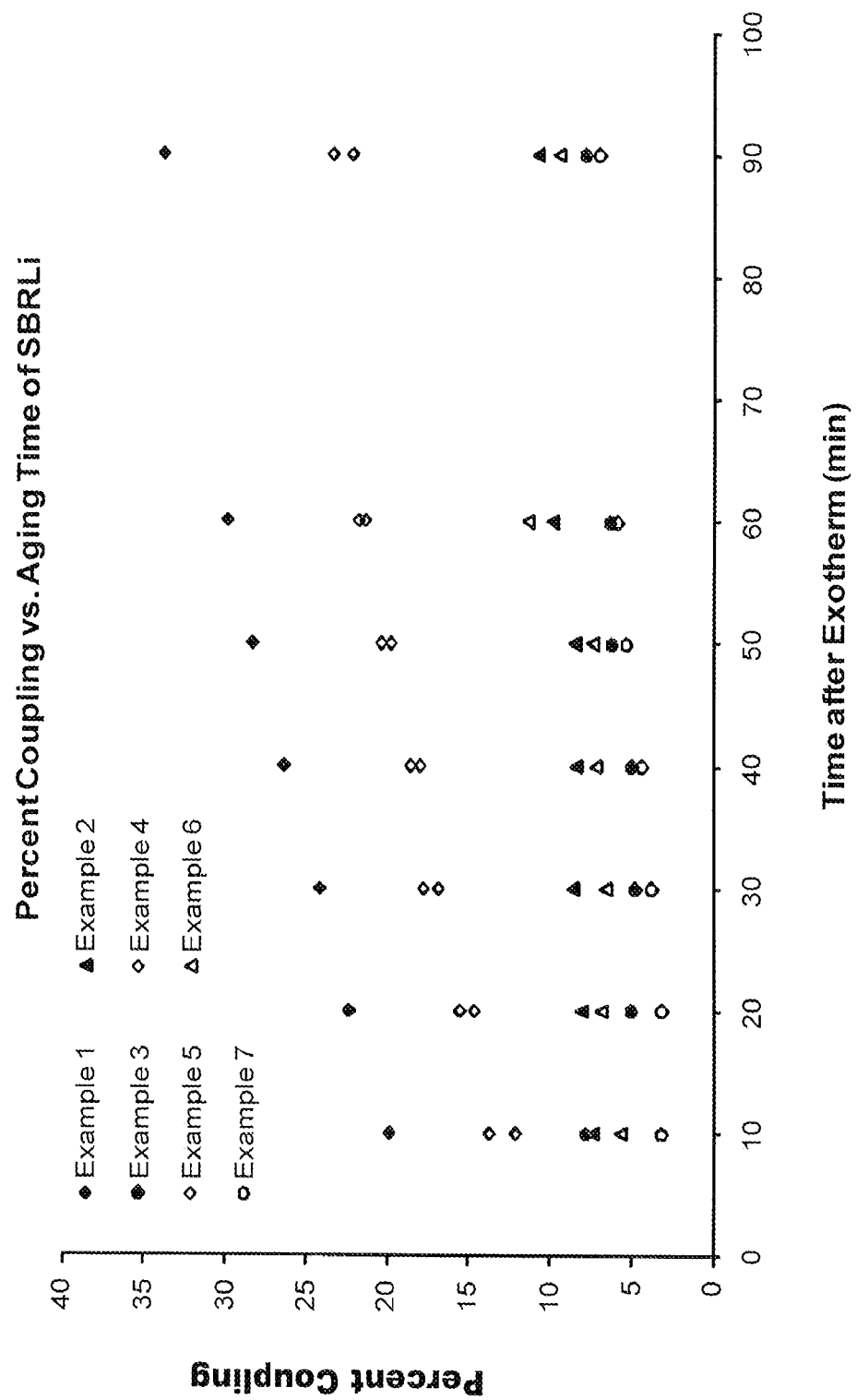

ANIONIC POLYMERIZATION METHODS FOR PRODUCING FUNCTIONALIZED POLYMERS

This application claims the benefit of U.S. Provisional Application Ser. No. 61/264,279, filed Nov. 25, 2009, which is incorporated herein by reference.

FIELD OF THE INVENTION

Embodiments of the invention are directed toward anionic polymerization methods that produce polymer compositions having a high percentage of functional end groups deriving from functional initiators.

BACKGROUND OF THE INVENTION

Anionic polymerization techniques have been used to synthesize polymers that are useful in the manufacture of tires. These methods advantageously allow for incorporation of a functional group at the ends of the polymer chains. These functional groups have had a beneficial impact on the performance of tires. For example, interaction between functional group and fillers has allowed for the production of tire treads exhibiting reduced hysteretic loss.

When preparing these polymers, certain initiators can impart a functional group to the head of the polymer (i.e. an end of the polymer where the initiator residue resides.) Terminating agents have also been employed to impart a functional group to the tail end of the anionically-polymerized polymer (i.e., an end nearest the location where the final monomer unit has been added to the polymer).

Where functional polymers are desired, it is advantageous to prepare polymeric compositions wherein a high percentage of the polymer molecules include the desired functional group. Where the functional group is obtained through a terminating reagent, the limiting factor may be the ability to maintain live (i.e., reactive) chain ends and/or the reaction efficiency between the terminating agent and the live polymer. Where the functional group derives from an initiator, the limiting factor is often the ability of the polymer to retain the head group. In other words, while the functional initiator may propagate a living polymer, the head group (i.e., the functional group located at the head of the polymer) may be cleaved from the polymer chain, especially at higher polymerization temperatures (e.g., above 100° C.), which temperatures are typical for many commercial anionic polymerization processes. For example, polydienyl polymers having a functional head group can be represented by the formula

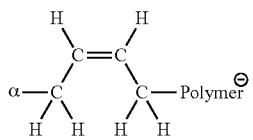

where α is a functional group and H' are allylic hydrogens. It is believed that the allylic hydrogens can be displaced by a polymer anion, and this displacement can lead to a reverse Michael Addition reaction that cleaves the functional group (α) from the polymer chain. The same sequence can also occur where a mer unit deriving from styrene is adjacent to the functional group (α), because the benzylic hydrogen of the mer unit can be displaced and also lead to a reaction that cleaves the functional group (α) from the polymer chain.

For example, U.S. Pat. No. 7,153,919 teaches the formation of a head-functionalized polymer by initiating the polymerization of conjugated diene (optionally together with styrene) with a lithiated thioacetal such as a dithiane. These functional polymers have proven to be technologically useful in the manufacture of tire treads since the head group exhibits desirable filler and/or polymer interaction thereby providing tire treads with advantageously low hysteretic loss. While these initiators were used to prepare polymer with high yields of functional head groups, the polymerization temperatures were maintained relatively low. Where higher polymerization temperatures are maintained, which are often desirable or necessary in commercial operations, the loss of head group functionality can occur.

Because polymeric compositions with a greater percentage of functional head groups would be advantageous, there is a desire to solve the problems of the prior art.

SUMMARY OF THE INVENTION

Embodiments of the present invention provide a process for producing functional polymer, the process comprising the steps of reacting an anionic initiator including a functional group with a stabilizing monomer to produce a stabilized initiator, reacting the stabilized initiator with monomer capable of being anionically polymerized to produce a polymer, and terminating the polymer.

Still other embodiments of the present invention provide a process for forming a functional polymer, the process comprising the steps of reacting an anionic initiator defined by the formula

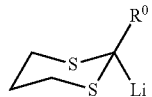

where $R^0$ includes a monovalent organic group together with a 1,1-diphenylethylene to form a stabilized initiator, and reacting the stabilized initiator with anionically-polymerizable monomer.

Still other embodiments of the present invention provide a process for forming a functional polymer, the process comprising the steps of reacting an anionic initiator defined by the formula

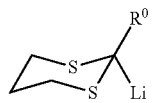

where $R^0$ includes a monovalent organic group together with a 1,1-diphenylethylene to form a stabilized initiator, and reacting the stabilized initiator with anionically-polymerizable monomer.

Still other embodiments of the present invention provide a polymer defined by the formula

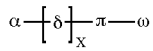

where α is a functional head group, δ is a stabilizing mer unit, x is an integer from 1 to 5, π is an anionically-polymerized polymer chain and ω is a terminal unit including a proton, a functional group, or a coupling moiety tethered to one or more additional polymer chains.

Still other embodiments of the present invention provide a tire component comprising the vulcanized residue of a polymer defined by the formula

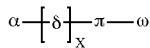

where α is a functional head group, δ is a stabilizing mer unit, x is an integer from 1 to 5, π is an anionically-polymerized polymer chain, and ω is a terminal unit including a proton, a functional group, or a coupling moiety tethered to one or more additional polymer chains.

BRIEF DESCRIPTION OF THE DRAWINGS

The FIGURE is a graphical representation of the amount of coupling observes as a function of time after exotherm for samples reported in the Example section of this specification.

DETAILED DESCRIPTION OF ILLUSTRATIVE EMBODIMENTS

One or more embodiments of the present invention are based, at least in part, on the discovery that polymeric compositions with a greater percentage of the polymer molecules including a functional head group can be obtained by incorporating one or more stabilizing mer units at a location adjacent to the head group. It is believed, and without being bound by any particular theory, that living polymers react with hydrogen atoms near the functional head group, and the anion generated undergoes a reverse Michael addition reaction that cleaves the head group from the polymer chain. This undesirable side reaction also results in undesirable coupling and premature polymer termination, which inhibits the ability to end functionalize the polymer. It is believed that practice of one or more embodiments of the present invention reduces anionic attack at or near the head group and thereby reduces undesirable loss of the head group, undesirable coupling, and undesirable loss of live ends. Advantageously, practice of the present invention allows for the production of anionically-polymerized polymers with a high percentage of functional head groups, even at higher, commercially typical, polymerization temperatures.

Accordingly, one or more embodiments of the present invention are directed toward a polymerization process whereby a functional initiator is reacted with a stabilizing monomer to yield an intermediary organometallic compound capable of further initiating the polymerization of conjugated diene and/or vinyl aromatic monomer. The process advantageously provides for a polymer composition having a greater percentage of polymers having a functional head group than was realized in the prior art.

In one or more embodiments, the polymer molecules prepared by the process of one or embodiments of this invention may be defined by the formula

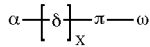

where α is a functional head group, δ is a stabilizing mer unit, x is an integer from 1 to 5, π is an anionically-polymerized polymer chain, and ω is a terminal unit including a portion, a functional group, or a coupling moiety tethered to one or more additional polymer chains.

In one or more embodiments, the head group (α) is the residue of a functional initiator and therefore includes one or more functional substituents. In one or more embodiments, these functional substituents may include one or more heteroatoms. Exemplary heteroatoms include silicon, sulfur, nitrogen, oxygen, tin, phosphorus, and boron. In one or more embodiments, the functional substituents include those groups that reduce the 50° C. hysteresis loss of carbon-black filled vulcanizates prepared from polymers containing the functional group as compared to similar carbon-black filled vulcanizates prepared from a similar polymer that does not include the functional group. This advantageous reduction in hysteresis loss may be at least 5%, in other embodiments at least 10%, and in other embodiments at least 15%. In certain embodiments, this reduction in the 50° C. hysteresis loss occurs within carbon black filled vulcanizates, in other embodiments, the reduction occurs within silica-filled vulcanizates, and in other embodiments the reduction occurs in vulcanizates that include a blend of silica and carbon black as filler.

The stabilizing mer unit (δ) derives from a stabilizing monomer. In one or more embodiments, the stabilizing mer unit is devoid of hydrogen atoms that are prone to a reaction with a carbanion resulting from anionic polymerization of the monomer. In one or more embodiments, these hydrogen atoms include those with a pKa of less than 30, in other embodiments less than 28, and in other embodiments less than 25.

In one or more embodiments, x is in an integer from 1 to 4, in other embodiments x is an integer from 1 to 3, in other embodiments x is an integer from 1 to 2, and in other embodiments x is 1.

In one or more embodiments, the polymer chain (π) contains unsaturation. In these or other embodiments, the polymer chain is vulcanizable. In one or more embodiments, the polymer chain (π) can have a glass transition temperature ($T_g$) that is less than 0° C., in other embodiments less and −20° C., and in other embodiments less than −30° C. In one embodiment, the polymers may exhibit a single glass transition temperature.

In one or more embodiments, the polymer chain (π) is a medium or low cis polydiene (or polydiene copolymer). These polydienes can have a cis content of from about 10% to 60%, in other embodiments from about 15% to 55%, and in other embodiments from about 20% to about 50%, where the percentages are based upon the number of diene mer units in the cis configuration versus the total number of diene mer units. These polydienes may also have a 1,2-linkage content (i.e. vinyl content) from about 10% to about 90%, in other embodiments from about 10% to about 60%, in other embodiments from about 15% to about 50%, and in other embodiments from about 20% to about 45%, where the percentages are based upon the number of diene mer units in the vinyl configuration versus the total number of diene mer units. The balance of the diene units may be in the trans-1,4-linkage configuration.

In particular embodiments, the polymer chain (π) is a copolymer of butadiene, styrene, and optionally isoprene. These copolymers may include random copolymers. In other embodiments, the polymers are block copolymers of polybutadiene, polystyrene, and optionally polyisoprene. In particular embodiments, the polymers are hydrogenated or partially hydrogenated.

In one or more embodiments, the polymer chain (π) is a polymer selected from the group consisting of polybutadiene, polyisoprene, poly(styrene-co-butadiene), poly(styrene-co-butadiene-co-isoprene), poly(isoprene-co-styrene), and poly(butadiene-co-isoprene).

In one or more embodiments, the number average molecular weight (Mn) of the polymer chain (π) may be from about 1 kg/mole to about 1,000 kg/mole in other embodiments from about 5 kg/mole to about 1,000 kg/mole, in other embodiments from about 50 kg/mole to about 500 kg/mole, and in other embodiments from about 100 kg/mole to about 300 kg/mole, as determined by using gel permeation chromatography (GPC) calibrated with polystyrene standards and Mark-Houwink constants for the polymer in question. The polydispersity (Mw/Mn) of the polymer chain may be from about 1.0 to about 3.0, and in other embodiments from about 1.1 to about 2.0.

In those embodiments where the terminal group (α) is a functional group, the group may be referred to as a terminal end group or terminal functional group, which refers to the fact that the group derives from a terminating reaction. In one or more embodiments, the terminal functional group may include a heteroatom. In one or more embodiments, the terminal functional group reduces the 50° C. hysteresis loss of vulcanizates including the terminal functional group as compared to similar vulcanizates with polymer not including the terminal functional group. In one or more embodiments, this reduction in hysteresis loss is at least 5%, in other embodiments at least 10%, and in other embodiments at least 15%. In certain embodiments, this reduction in the 50° C. hysteresis loss occurs within carbon black filled vulcanizates, in other embodiments the reduction occurs with the silica-filled vulcanizates, and in other embodiments the reduction occurs in vulcanizates that include a blend of silica and carbon black as filler.

In one or more embodiments, the terminal functional group is a heteroatom-bearing substituent that includes an electron rich species or metal-containing species. In these or other embodiments, the functional group reacts or interacts with rubber or rubber fillers or otherwise has a desirable impact on filled rubber compositions or vulcanizates.

In those embodiments where the terminal group is a coupling moiety (α), the terminal group includes a coupling moiety that may be tethered to one or more polymer chains and therefore may be defined by the formula —$Z(\pi)_y$, where Z is a coupling moiety such as tin or silica, π is a polymer chain, and y is an integer equal to the valence of Z less 1.

As noted above, the process of the present invention includes reacting a functional initiator with a stabilizing monomer to form a stabilized-functional initiator, and the stabilized-functional initiator is then used to polymerize anionically-polymerizable monomer in a manner conventional in the art. The polymerization produces a living polymer that can be quenched with a proton, terminally functionalized, or coupled using techniques known in the art.

In one or more embodiments, the functional initiator includes a metal atom bonded to a carbon atom in a manner conventionally understood in the art. In one or more embodiments, the metal that is bonded to the carbon atom is an alkali or alkaline earth metal. Specific examples of these metals include lithium, sodium, potassium, and magnesium.

The initiator also includes at least one functional group or substituent. The description set forth above for the functional group applies to the description of the initiator.

In one or more embodiments, useful functional initiators include those that will add to a stabilizing monomer (e.g., 1,1-diphenylethylene). As those skilled in the art appreciate, the ability of a functional initiator to add to a stabilizing monomer can be determined from the basicity of the functional initiator-stabilized monomer adduct as compared to the basicity of the functional initiator. In other words, if the functional initiator-stabilized monomer adduct is appreciably less basic than the functional initiator, the reaction will proceed to form the stabilized initiator. If the functional initiator-stabilized monomer adduct is appreciably more basic than the functional initiator, then the stabilized initiator will not be formed. In one or more embodiments, the adduct is appreciably more basic than the initiator when the pKa of the adduct is at least 2, in other embodiments at least 3, and in other embodiments at least 5 pKa points greater than the pKa of the functional initiator.

In one or more embodiments, the functional initiator includes a lithiated thioacetal such as a lithiated dithiane. Lithiated thioacetals are known and include those described in U.S. Pat. Nos. 7,153,919, 7,319,123, 7,462,677, and 7,612,144, which are incorporated herein by reference.

In one or more embodiments, the thioacetal initiators employed in this invention can be defined by the formula

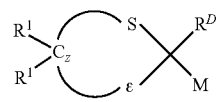

where each $R^1$ independently includes hydrogen or a monovalent organic group, $R^0$ includes a monovalent organic group, z is an integer from 1 to about 8, ε includes sulfur, oxygen, or tertiary amino (NR, where R is an organic group), and M is a metal. In one or more embodiments, the metal may include lithium, sodium, potassium, or magnesium.

In one or more embodiments, the functional initiators may be defined by the formula

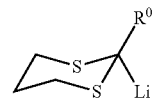

where $R^0$ includes a monovalent organic group.

Specific examples of functional initiators include 2-lithio-2-phenyl-1,3-dithiane, 2-lithio-2-(4-dimethylaminophenyl)-1,3-dithiane, and 2-lithio-2-(4-dibutylaminophenyl)-1,3-dithiane, 2-lithio-[4-(4-methylpiperazino)]phenyl-1,3-dithiane, 2-lithio-[2-(4-methylpiperazino)]phenyl-1,3-dithiane, 2-lithio-[2-morpholino]phenyl-1,3-dithiane, 2-lithio-[4-morpholin-4-yl]phenyl-1,3-dithiane, 2-litho-[2-morpholin-4-yl-pyridine-3]-1,3-dithiane, 2-lithio-[6-morpholin-4-pyridino-3]-1,3-dithiane, 2-lithio-[4-methyl-3,4-dihydro-2H-1,4-benzoxazine-7]-1,3-dithiane, and mixture thereof.

In one or more embodiments, a stabilizing monomer includes a molecule that reacts with and adds to an anionic initiator to produce a stabilized anionic polymerization initiator; i.e., it produces an intermediary molecule capable of initiating the polymerization of anionically-polymerizable monomer.

In one or more embodiments, the stabilizing monomer is an unsaturated molecule that is incapable or has a reduced tendency to homopolymerize upon reacting with the functional initiator. In particular embodiments, less than 3 monomer, in other embodiments less than 2 monomer, and in other embodiments only 1 stabilizing monomer reacts with and adds to the functional initiator molecule.

In one or more embodiments, the stabilizing monomer may be represented by the formula

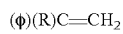

where R is a hydrocarbyl group and φ is an aryl or substituted aryl group. In one or more embodiments, hydrocarbyl groups include, but not limited to, alkyl, cycloalkyl, substituted cycloalkyl, alkenyl, cycloalkenyl, substituted cycloalkenyl, aryl, substituted aryl, aralkyl, alkaryl, and allyl groups.

In particular embodiments, R is a hydrocarbyl group that contributes to an overall steric hindrance within the molecule. In one or more embodiments, hydrocarbyl groups that contribute to an overall steric hindrance include those groups where the α carbon of the group (i.e., the carbon atom directly attached to the ethylene group) includes less than 3 hydrogen atoms directly bonded thereto, in other embodiments less than 2 hydrogen atoms directly bonded thereto, or in other embodiments no hydrogen atoms bonded directly thereto. In particular embodiments, these groups may be referred to as branched hydrocarbyl groups.

For example, R may be defined by the formula —C(R')$_3$, where C is the α carbon and R' is a hydrogen atom or a hydrocarbyl group with the proviso that at least 2 R' are independently hydrocarbyl groups. In other embodiments, each R' is a hydrocarbyl group. In these or other embodiments, each R' includes at least 2, in other embodiments at least 3, and in other embodiments at least 4 carbon atoms.

In other embodiments, hydrocarbyl groups that contribute to an overall steric hindrance include cyclic hydrocarbyl groups and substituted cyclic hydrocarbyl groups. In other embodiments, hydrocarbyl groups that contribute to an overall steric hindrance include aryl and substituted aryl groups. In these or other embodiments, hydrocarbyl groups that contribute to an overall steric hindrance include heterocyclic hydrocarbyl groups. In yet other embodiments, hydrocarbyl groups that contribute to an overall steric hindrance include heteroaromatic groups.

Specific examples of branched hydrocarbyl groups include, but are not limited to, an isopropyl group, a tertiary butyl group, and a neopentyl group.

Examples of cyclic hydrocarbyl groups include a cyclopentyl group, a cyclohexyl group, a cycloheptyl group, a cyclooctyl group, and substituted species thereof.

Examples of aryl or substituted aryl groups include a phenyl group and substituted species thereof such as 2-methylphenyl, 3-methylphenyl, 4-methylphenyl, 2,3-dimethylphenyl, 3,4-dimethylphenyl, 2,5-dimethylphenyl, 2,6-dimethylphenyl, 2,4,6-trimethylphenyl (also called mesityl), and naphthyl groups.

Examples of heterocyclic groups morpholinyl, thiomorpholinyl, piperidinyl, N-hydrocarbyl-piperazinyl, and pyrrolidinyl groups.

Examples of heteroaromatic groups include 2-furyl, 3-furyl, N-methyl-2-pyrrolyl, N-methyl-3-pyrrolyl, pyrazinyl, 2-pyrimidinyl, 3-pyridazinyl, 3-isothiazolyl, and 2-triazinyl groups.

In one or more embodiments, types stabilizing monomer include 1,1-diarylethylenes or a 1-aryl-1-hydrocarbylethylenes.

Specific examples of stabilizing monomer include 1,1-diphenylethylene, α-t-butylstyrene, α-iso-propylstyrene, and 1-methyl-1-mesityl ethylene, 1-cyclopentyl-1-phenylethylene, 1-naphthyl-1-phenylethylene, and 1-pyrrodinyl-1-phenylethylene.

In one or more embodiments, monomer that can be polymerized by anionic polymerization techniques (i.e. anionically-polymerizable monomer) include conjugated dienes and vinyl aromatics. Examples of conjugated diene monomer include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization. Examples of vinyl aromatic monomer include vinyl-substituted aromatic compounds such as styrene, p-methylstyrene, α-methylstyrene, and vinylnaphthalene.

In one or more embodiments, the living polymer can be protonated or subsequently functionalized or coupled. Protonation can occur by the addition of any compound that can donate a proton to the living end. Examples include water, isopropyl alcohol, and methyl alcohol.

In one or more embodiments, the living polymer can be terminated with a compound that will impart a functional group to the terminus of the polymer. Useful functionalizing agents include those conventionally employed in the art. Types of compounds that have been used to end-functionalize living polymers include carbon dioxide, benzophenones, benzaldehydes, imidazolidones, pyrrolidinones, carbodiimides, ureas, isocyanates, and Schiff bases including those disclosed in U.S. Pat. Nos. 3,109,871, 3,135,716, 5,332,810, 5,109,907, 5,210,145, 5,227,431, 5,329,005, 5,935,893, which are incorporated herein by reference. Specific examples include trialkyltin halides such as tributyltin chloride, as disclosed in U.S. Pat. Nos. 4,519,431, 4,540,744, 4,603,722, 5,248,722, 5,349,024, 5,502,129, and 5,877,336, which are incorporated herein by reference. Other examples include cyclic amino compounds such as hexamethyleneimine alkyl chloride, as disclosed in U.S. Pat. Nos. 5,786,441, 5,916,976 and 5,552,473, which are incorporated herein by reference. Other examples include N-substituted aminoketones, N-substituted thioaminoketones, N-substituted aminoaldehydes, and N-substituted thioaminoaldehydes, including N-methyl-2-pyrrolidone or dimethylimidazolidinone (i.e., 1,3-dimethylethyleneurea) as disclosed in U.S. Pat. Nos. 4,677,165, 5,219,942, 5,902,856, 4,616,069, 4,929,679, 5,115,035, and 6,359,167, which are incorporated herein by reference. Additional examples include cyclic sulfur-containing or oxygen containing azaheterocycles such as disclosed in U.S. Publication No. 2006/0074197 A1, U.S. Publication No. 2006/0178467 A1 and U.S. Pat. No. 6,596,798, which are incorporated herein by reference. Other examples include boron-containing terminators such as disclosed in U.S. Pat. No. 7,598,322, which is incorporated herein by reference. Still other examples include cyclic siloxanes such as hexamethylcyclotrisiloxane, including those disclosed in copending U.S. Publication No. 2007/0149744 A1, which is incorporated herein by reference. Further other examples include α-halo-ω-amino alkanes, such as 1-(3-bromopropyl)-2,2,5,5-tetramethyl-1-aza-2,5-disilacyclopentane, including those disclosed in copending U.S. Publication Nos. 2007/0293620 A1 and 2007/0293620 A1, which are incorporated herein by reference.

In one or more embodiments, the living polymer can be coupled to link two or more living polymer chains together. In certain embodiments, the living polymer can be treated with both coupling and functionalizing agents, which serve to couple some chains and functionalize other chains. The combination of coupling agent and functionalizing agent can be used at various molar ratios. Although the terms coupling and functionalizing agents have been employed in this specification, those skilled in the art appreciate that certain compounds may serve both functions. That is, certain compounds may both couple and provide the polymer chains with a functional group. Those skilled in the art also appreciate that the ability to couple polymer chains may depend upon the amount of coupling agent reacted with the polymer chains. For example, advantageous coupling may be achieved where the coupling agent is added in a one to one ratio between the equivalents of lithium on the initiator and equivalents of leaving groups (e.g., halogen atoms) on the coupling agent.

Exemplary coupling agents include metal halides, metalloid halides, alkoxysilanes, and alkoxystannanes.

In one or more embodiments, useful metal halides or metalloid halides may be selected from the group comprising compounds expressed by the formula (1) $R^1{}_nM^1X_{4-n}$, the formula (2) $M^1X_4$, and the formula (3) $M^2X_3$, where $R^1$ is the same or different and represents a monovalent organic group with carbon number of 1 to about 20, $M^1$ in the formulas (1) and (2) represents a tin atom, silicon atom, or germanium atom, $M^2$ represents a phosphorous atom, X represents a halogen atom, and n represents an integer of 0-3.

Exemplary compounds expressed by the formula (1) include halogenated organic metal compounds, and the compounds expressed by the formulas (2) and (3) include halogenated metal compounds.

In the case where $M^1$ represents a tin atom, the compounds expressed by the formula (1) can be, for example, triphenyltin chloride, tributyltin chloride, triisopropyltin chloride, trihexyltin chloride, trioctyltin chloride, diphenyltin dichloride dibutyltin dichloride, dihexyltin dichloride, dioctyltin dichloride, phenyltin trichloride, butyltin trichloride, octyltin trichloride and the like. Furthermore, tin tetrachloride, tin tetrabromide and the like can be exemplified as the compounds expressed by formula (2).

In the case where $M^1$ represents a silicon atom, the compounds expressed by the formula (1) can be, for example, triphenylchlorosilane, trihexylchlorosilane, trioctylchlorosilane, tributylchlorosilane, trimethylchlorosilane, diphenyldichlorosilane, dihexyldichlorosilane, dioctyldichlorosilane, dibutyldichlorosilane, dimethyldichlorosilane, methyltrichlorosilane, phenyltrichlorosilane, hexyltrichlorosilane, octyltrichlorosilane, butyltrichlorosilane, methyltrichlorosilane and the like. Furthermore, silicon tetrachloride, silicon tetrabromide and the like can be exemplified as the compounds expressed by the formula (2). In the case where $M^1$ represents a germanium atom, the compounds expressed by the formula (1) can be, for example, triphenylgermanium chloride, dibutylgermanium dichloride, diphenylgermanium dichloride, butylgermanium trichloride and the like. Furthermore, germanium tetrachloride, germanium tetrabromide and the like can be exemplified as the compounds expressed by the formula (2). Phosphorous trichloride, phosphorous tribromide and the like can be exemplified as the compounds expressed by the formula (3). In one or more embodiments, mixtures of metal halides and/or metalloid halides can be used.

In one or more embodiments, useful alkoxysilanes or alkoxystannanes may be selected from the group comprising compounds expressed by the formula (1) $R^1{}_nM^1(OR)_{4-n}$, where $R^1$ is the same or different and represents a monovalent organic group with carbon number of 1 to about 20, $M^1$ represents a tin atom, silicon atom, or germanium atom, OR represents an alkoxy group where R represents a monovalent organic group, and n represents an integer of 0-3.

Exemplary compounds expressed by the formula (4) include tetraethyl orthosilicate, tetramethyl orthosilicate, tetrapropyl orthosilicate, tetraethoxy tin, tetramethoxy tin, and tetrapropoxy tin.

According to one or more embodiments of the present invention, the reaction between the anionic functional initiator and the stabilizing monomer causes the stabilizing monomer to add to the initiator and thereby form a stabilized initiator. In one or more embodiments, the stabilized initiator may be defined by the formula

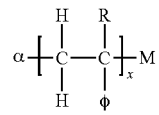

where α is the residue of a functional initiator, φ is an aryl or substituted aryl group, R is a hydrocarbyl group, x is an integer from 1 to 5, and M is a metal such as lithium.

This stabilized initiator is then used to polymerize monomer capable of being polymerized by anionic polymerization techniques, which may be conducted using conventional anionic polymerization techniques, to produce a living polymer that has a stabilized mer unit adjacent to the functional group such as that defined by the following formula.

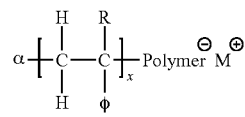

where α is the residue of a functional initiator, φ is an aryl or substituted aryl group, R is a hydrocarbyl group, x is an integer from 1 to 5, and M is a metal such as lithium. The polymer anion (i.e., polymer$^\ominus$) may be consistent with the polymer (π) described above.

Upon quenching, functionalization, and/or coupling, the resulting polymer may be defined by the formula

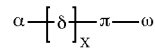

where α is a functional head group, δ is a stabilizing mer unit, x is an integer from 1 to 5, π is an anionically-polymerized polymer chain, and ω is a terminal unit including a portion, a functional group, or a coupling moiety tethered to one or more additional polymer chains.

In one or more embodiments, the stabilized initiator may be prepared prior to introducing the initiator to the monomer. In other embodiments, the stabilized initiator may be prepared in-situ. The reaction between the functional initiator and the stabilizing monomer may take place with a solvent, such as those solvents employed in the polymerization reaction (e.g., aliphatic solvents such as mixtures of hexanes). The initiator and the stabilizing monomer can be charged sequentially or simultaneously to the reactor in which the stabilized initiator is prepared, which may include the reactor in which the polymer is synthesized. The reaction between the functional initiator and the stabilizing monomer can occur under inert atmospheric pressure at a temperature of from about −80 to about 100° C. or in other embodiments from about 20 to about 50° C. In one or more embodiments, from about 0.5 to about 5.0 mole, or in other embodiments from about 1.0 to about 4.0 mole of the stabilizing monomer is charged per mole of metal (e.g., lithium) on the functional initiator (which is tantamount to the moles of initiator for a mono-lithiated initiator).

Once the monomer to be polymerized is combined with the stabilized initiator, the polymerization proceeds as generally known in the art. As is generally known, by reacting anionic initiators with certain unsaturated monomers, an active polymer having a metal cation is produced. This active polymer may be referred to as living. A new batch of monomer subsequently added to the reaction can add to the active ends of the existing chains and increase the degree of polymerization. A living polymer, therefore, includes a polymeric segment having a living or reactive end. Anionic polymerization is further described in George Odian, *Principles of Polymerization*, ch. 5 ($3^{rd}$ Ed. 1991), or Panek, 94 J. Am. Chem. Soc., 8768 (1972), which are incorporated herein by reference.

The polymerization process of this invention may be conducted in non-polar solvents and mixtures of non-polar solvents with polar-solvents. These solvents may include aliphatic solvents such as n-pentane, n-hexane, n-heptane, n-octane, n-nonane, n-decane, isopentane, isohexanes, isoheptanes, isooctanes, 2,2-dimethylbutane, petroleum ether, kerosene, petroleum spirits, and mixtures thereof. Some representative examples of suitable cycloaliphatic solvents include cyclopentane, cyclohexane, methylcyclopentane, methylcyclohexane, and mixtures thereof. Mixtures of aliphatic and cycloaliphatic solvents may be employed. In other embodiments, the solvent may be an ether such as tetrahydrofurane (THF), tetrahydropyran, diglyme, 1,2-dimethoxyethene, 1,6-dimethoxyhexane, 1,3-dioxane, 1,4-dioxane, anisole, ethoxybenzene, and mixtures thereof.

In other embodiments, the polymerization process of this invention can be conducted in a bulk system.

In order to promote randomization in copolymerization and to control vinyl content, a polar coordinator may be added to the polymerization ingredients. Amounts may range between 0 and 90 or more equivalents per equivalent or lithium. The amount may depend on the amount of vinyl desired, the level of styrene employed and the temperature of the polymerization, as well as the nature of the specific polar coordinator (modifier) employed. Suitable polymerization modifiers include ethers or amines to provide the desired microstructure and randomization of the comonomer units.

When elastomeric copolymers containing mer units deriving from conjugated diene monomer and vinyl-substituted aromatic monomer are desired, the conjugated diene monomers and vinyl-substituted aromatic monomers may be used at a weight ratio of 95:5 to 50:50, or in other embodiments, 90:10 to 65:35.

Compounds useful as polar coordinators include those having an oxygen or nitrogen heteroatom and a non-bonded pair of electrons. Examples include dialkyl ethers of mono and oligo alkylene glycols; "crown" ethers; tertiary amines such as tetramethylethylene diamine (TMEDA); linear THF oligomers; and the like. Specific examples of compounds useful as polar coordinators include tetrahydrofuran (THF), linear and cyclic oligomeric oxolanyl alkanes such as 2,2-bis (2'-tetrahydrofuryl) propane, di-piperidyl ethane, dipiperidyl methane, hexamethylphosphoramide, N-N'-dimethylpiperazine, diazabicyclooctane, dimethyl ether, diethyl ether, tributylamine and the like. The linear and cyclic oligomeric oxolanyl alkane modifiers are described in U.S. Pat. No. 4,429,091, incorporated herein by reference.

The amount of randomizer to be employed may depend on various factors such as the desired microstructure of the polymer, the ratio of monomer to comonomer, the polymerization temperature, as well as the nature of the specific randomizer employed. In one or more embodiments, the amount of randomizer employed may range between 0.05 and 100 moles per mole of the anionic initiator.

Anionically polymerized living polymers can be prepared by either batch or continuous methods. In one or more embodiments, a batch polymerization is begun by charging a blend of monomer(s), and optionally a solvent such as a normal alkane solvent, to a suitable reaction vessel, followed by the addition of the polar coordinator (if employed) and the stabilized initiator. The reactants may be heated to a temperature of from about 20 to about 130° C. (e.g., greater than 60° C., in other embodiments greater than 80° C., or in other embodiments greater than 85° C.) and the polymerization may be allowed to proceed for from about 0.1 to about 24 hours.

In one or more embodiments, the stabilized initiator and the randomizer can be introduced to the polymerization system by various methods. In one or more embodiments, the stabilized initiator and the randomizer may be added separately to the monomer to be polymerized in either a stepwise or simultaneous manner. In other embodiments, the stabilized initiator and the randomizer may be pre-mixed outside the polymerization system either in the absence of any monomer or in the presence of a small amount of monomer, and the resulting mixture may be aged, if desired, and then added to the monomer that is to be polymerized.

This reaction produces a reactive polymer having a active or living end. In one or more embodiments, at least about 30% of the polymer molecules contain a living end, in other embodiments at least about 50% of the polymer molecules contain a living end, and in other embodiments at least about 80% contain a living end.

In one embodiment, the functionalizing agent may be added to the living polymer cement (i.e., polymer and solvent) once a peak polymerization temperature, which is indicative of nearly complete monomer conversion, is observed. Because live ends may self-terminate, the functionalizing agent may be added within about 25 to 35 minutes of the peak polymerization temperature.

The amount of functionalizing agent employed to prepare the functionalized polymers is best described with respect to the equivalents of lithium or metal cation associated with the initiator. For example, the moles of functionalizing agent per mole of lithium may be about 0.3 to about 2, in other embodiments from about 0.6 to about 1.5, in other embodiments from about 0.7 to about 1.3, in other embodiments from about 0.8 to about 1.1, and in other embodiments from about 0.9 to about 1.0.

After formation of the polymer, a processing aid and other optional additives such as oil can be added to the polymer cement. The polymer and other optional ingredients may then be isolated from the solvent and optionally dried. Conventional procedures for desolventization and drying may be employed. In one embodiment, the polymer may be isolated from the solvent by steam desolventization or hot water coagulation of the solvent followed by filtration. Residual solvent may be removed by using conventional drying techniques such as oven drying or drum drying. Alternatively, the cement may be directly drum dried.

The functional polymers of this invention are particularly useful in preparing tire components. These tire components can be prepared by using the functional polymers of this invention alone or together with other rubbery polymers. Other rubbery polymers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers.

Useful elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

The rubber compositions may include fillers such as inorganic and organic fillers. Reinforcing fillers may advantageously be used. The organic fillers include carbon black and starch. The inorganic fillers may include silica, aluminum hydroxide, magnesium hydroxide, clays (hydrated aluminum silicates), and mixtures thereof.

In one or more embodiments, silica (silicon dioxide) includes wet-process, hydrated silica produced by a chemical reaction in water, and precipitated as ultra-fine spherical particles. In one embodiment, the silica has a surface area of about 32 to about 400 $m^2/g$, in another embodiment about 100 to about 250 $m^2/g$, and in yet another embodiment, about 150 to about 220 $m^2/g$. The pH of the silica filler in one embodiment is about 5.5 to about 7 and in another embodiment about 5.5 to about 6.8. Commercially available silicas include Hi-Sil™ 215, Hi-Sil™ 233, Hi-Sil™ 255LD, and Hi-Sil™ 190 (PPG Industries; Pittsburgh, Pa.), Zeosil™1165MP and 175GRPlus (Rhodia), Vulkasil™ (Bary AG), Ultrasil™ VN2, VN3 (Degussa), and HuberSil™ 8745 (Huber).

In one or more embodiments, the carbon blacks may include any of the commonly available, commercially-produced carbon blacks. These include those having a surface area (EMSA) of at least 20 $m^2$/gram and in other embodiments at least 35 $m^2$/gram up to 200 $m^2$/gram or higher. Surface area values include those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks semi-reinforcing furnace (SRF) blacks, medium processing channel blacks, hard processing channel blacks and conducting channel blacks. Other carbon blacks that may be utilized include acetylene blacks. Mixtures of two or more of the above blacks can be used in preparing the carbon black products of the invention. Exemplary carbon blacks include those bearing ASTM designation (D-1765-82a) N-110, N-220, N-339, N-330, N-351, N-550, and N-660. In one or more embodiments, the carbon black may include oxidized carbon black.

In one embodiment, silica may be used in an amount of from about 5 to about 100 parts by weight parts per hundred rubber (phr), in another embodiment from about 10 to about 90 parts by weight phr, in yet another embodiment from about 15 to about 80 parts by weight phr, and in still another embodiment from about 25 to about 75 parts by weight phr.

A multitude of rubber curing agents may be employed, including sulfur or peroxide-based curing systems. Curing agents are described in Kirk-Othmer, ENCYCLOPEDIA OF CHEMICAL TECHNOLOGY, Vol. 20, pgs. 365-468, ($3^{rd}$ Ed. 1982), particularly *Vulcanization Agents and Auxiliary Materials*, pgs. 390-402, and A.Y. Coran, *Vulcanization*, ENCYCLOPEDIA OF POLYMER SCIENCE AND ENGINEERING, ($2^{nd}$ Ed. 1989), which are incorporated herein by reference. Vulcanizing agents may be used alone or in combination. In one or more embodiments, the preparation of vulcanizable compositions and the construction and curing of the tire is not affected by the practice of this invention.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers. Examples of oils include paraffinic oils, aromatic oils, naphthenic oils, vegetable oils other than castor oils, and low PCA oils including MES, TDAE, SRAE, heavy naphthenic oils, and black oils.

These stocks are useful for forming tire components such as treads, subtreads, black sidewalls, body ply skins, bead filler, and the like. Preferably, the functional polymers are employed in tread formulations. In one or more embodiments, these tread formulations may include from about 10 to about 100% by weight, in other embodiments from about 35 to about 90% by weight, and in other embodiments from about 50 to 80% by weight of the functional polymer based on the total weight of the rubber within the formulation.

In one or more embodiments, the vulcanizable rubber composition may be prepared by forming an initial masterbatch that includes the rubber component and filler (the rubber component optionally including the functional polymer of this invention). This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mix stage, which preferably does not initiate the vulcanization process. Optionally, additional mixing stages, sometimes called remills, can be employed between the masterbatch mix stage and the final mix stage. Various ingredients including the functional polymer of this invention can be added during these remills. Rubber compounding techniques and the additives employed therein are generally known as disclosed in *The Compounding and Vulcanization of Rubber*, in *Rubber Technology* ($2^{nd}$ Ed. 1973).

The mixing conditions and procedures applicable to silica-filled tire formulations are also well known as described in U.S. Pat. Nos. 5,227,425, 5,719,207, 5,717,022, and European Paten No. 890,606, all of which are incorporated herein by reference. In one or more embodiments, where silica is employed as filler (alone or in combination with other fillers), a coupling and/or shielding agent may be added to the rubber formulation during mixing. Useful coupling and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference. In one embodiment, the initial masterbatch is prepared by including functional polymer of this invention and silica in the substantial absence of coupling and shielding agents. It is believed that this procedure will enhance the opportunity that the functional polymer will react or interact with silica before competing with coupling or shielding agents, which can be added later curing remills.

Where the vulcanizable rubber compositions are employed in the manufacture of tires, these compositions can be processed into tire components according to ordinary tire manufacturing techniques including standard rubber shaping, molding and curing techniques. Any of the various rubber tire components can be fabricated including, but not limited to, treads, sidewalls, belt skins, and carcass. Typically, vulcanization is effected by heating the vulcanizable composition in a mold; e.g., it may be heated to about 140 to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211 and 5,971,046, which are incorporated herein by reference.

To a 7.52 L reactor was added 1.54 kg of hexane, 0.38 kg of 33 weight percent styrene in hexanes, and 2.53 kg of 22.0 weight percent 1,3-butadiene in hexanes. A solution of 11.66 mL 0.5M 2-(4-dimethylaminophenyl)-1,3-dithiane in tetrahydrofuran (THF), 2.86 mL of 1.0M triethylamine in hexanes, and 4.05 mL n-butyllithium in hexanes was added to the reactor at 13.2° C. Then, 1.20 mL of 1.6 M 2,2-di(tetrahydrofuryl)propane in hexane was added. The reactor was heated and the peak exotherm temperature was noted. Samples were then taken from the reactor at 10, 20, 30, 40, 50, 60 and 90 minutes after exotherm and terminated with 2-propanol. Gel permeation chromatography was used to determine the area percent of the coupled peak compared to the base peak. As shown in the FIGURE, sample 1 was run to a peak polymerization temperature of 93.3° C. ( ), sample 2 was run to a peak polymerization temperature of 73.3° C. (▲), and sample 3 was run to a peak polymeriazation temperature of 58.8° C. (●).

EXAMPLES

To a 7.52 L reactor was added 1.54 kg of hexane, 0.38 kg of 33 weight percent styrene in hexanes, and 2.53 kg of 22.0 weight percent 1,3-butadiene in hexanes. A solution of 11.66 mL 0.5M 2-(4-dimethylaminophenyl)-1,3-dithiane in tetrahydrofuran (THF), 2.86 mL of 1.0M triethylamine in hexanes, and 4.05 mL n-butyllithium in hexanes was formed and to this added 1.14 mL of 5.66M 1,1-diphenylethylene before addition to the reactor at 13.2° C. Then, 1.20 mL of 1.6 M 2,2-di(tetrahydrofuryl)propane in hexane was added. The reactor was heated and the peak exotherm temperature was noted. Samples were then taken from the reactor at 10, 20, 30, 40, 50, 60 and 90 minutes after exotherm and terminated with 2-propanol. Gel permeation chromatography was used to determine the area percent of the coupled peak compared to the base peak. As shown in the FIGURE, samples 4 and 5 were run to a peak polymerization temperature of 93.3° C. (◇), sample 6 was run to a peak polymerization temperature of 73.3° C. (Δ), and sample 7 was run to a peak polymerization temperature of 58.8° C. (○).

Samples 1-3

To a 7.52 L reactor was added 1.54 kg of hexane, 0.38 kg of 33 weight percent styrene in hexanes, and 2.53 kg of 22.0 weight percent 1,3-butadiene in hexanes. A solution of 11.66 mL 0.5M 2-(4-dimethylaminophenyl)-1,3-dithane in tetrahydrofuran (THF), 2.86 mL of 1.0M triethylamine in hexanes, and 4.05 mL n-butyllithium in hexanes was added to the reactor at 13.2° C. Then, 1.20 mL of 1.6 M 2,2-di(tetrahydrofuryl)propane in hexane was added. The reactor was heated and the peak exotherm temperature was noted. Samples were then taken from the reactor at 10, 20, 30, 40, 50, 60 and 90 minutes after exotherm and terminated with 2-propanol. Gel permeation chromatography was used to determine the area percent of the coupled peak compared to the base peak. As shown in the FIGURE, sample 1 was run to a peak polymerization temperature of 93.3° C. (♦), sample 2 was run to a peak polymerization temperature of 73.3° C. (▲), and sample 3 was run to a peak polymerization temperature of 58.8° C. (●).

Samples 4-7

To a 7.52 L reactor was added 1.54 kg of hexane 0.38 kg of 33 weight percent styrene in hexanes, and 2.53 kg of 22.0 weight percent 1,3-butadiene in hexanes. A solution of 11.66 mL 0.5M 2-(4-dimethylaminophenyl)-1,3-dithane in tetrahydrofuran (THF), 2.86 mL of 1.0M triethylamine in hexanes, and 4.05 mL n-butyllithium in hexanes was formed and to this added 1.14 mL of 5.66M 1,1-diphenylethylene before addition to the reactor at 13.2° C. Then, 1.20 mL of 1.6 M 2,2-di (tetrahydrofuryl)propane in hexane was added. The reactor was heated and the peak exotherm temperature was noted. Samples were then taken from the reactor at 10, 20, 30, 40, 50, 60 and 90 minutes after exotherm and terminated with 2-propanol. Gel permeation chromatography was used to determine the area percent of the coupled peak compared to the base peak. As shown in the FIGURE, samples 4 and 5 were run to a peak polymerization temperature of 93.3° C. (◇), sample 6 was run to a peak polymerization temperature of 73.3° C. (Δ), and sample 7 was run to a peak polymerization temperature of 58.8° C. (o).

As can be seen in the FIGURE, the amount of coupled polymer decreases by 35% at 93° C., 12.2% at 73.3° C. and 10.7% at 58.8° C. when 1,1-diphenylethylene is added to the initiator solution prior to polymerization.

Various modifications and alterations that do not depart from the scope and spirit of this invention will become apparent to those skilled in the art. This invention is not to be duly limited to the illustrative embodiments set forth herein.

What is claimed is:

1. A process for producing functional polymer, the process comprising the steps of:
   i. reacting an anionic initiator including a functional group with a stabilizing monomer to produce a stabilized initiator, where the stabilizing monomer is selected from the group consisting of 1,1-diphenylethylene, α-t-butylstyrene, α-iso-propylstyrene, and 1-methyl-1-mesityl ethylene, 1-cyclopentyl-1-phenyl ethylene, 1-naphthyl-1-phenylethylene, and 1-pyrrolidinyl-1-phenylethylene, where the anionic initiator is defined by the formula

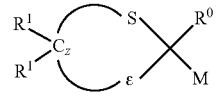

where each $R^1$ independently includes hydrogen or a monovalent organic group, $R^0$ includes a monovalent organic group, z is an integer from 1 to about 8, ε includes sulfur, oxygen, or tertiary amino, and M is a metal;
   ii. reacting the stabilized initiator with conjugated diene monomer, and optionally vinyl aromatic monomer, capable of being anionically polymerized to produce a polymer; and
   iii. terminating the polymer.

2. The process of claim 1, where said step of reacting an anionic initiator including a functional group with a stabilizing monomer takes place in the presence of at least a portion of the monomer capable of being anionically polymerized.

3. The process of claim 1, where said step of reacting an anionic initiator including a functional group with a stabilizing monomer takes place in the absence of monomer capable of being anionically polymerized.

4. The process of claim 1, where the anionically-polymerizable monomer is selected from the group consisting of conjugated dienes and vinyl aromatics.

5. The process of claim 1, where said step of reacting includes reacting from about 0.5 to about 5.0 moles stabilizing monomer per mole of anionic initiator.

6. The process of claim 1, where said step of terminating includes protonating, end-functionalizing, or coupling.

7. A process for forming a functional polymer, the process comprising the steps of:
  i. reacting an anionic initiator defined by the formula

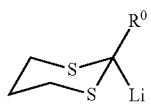

where $R^0$ includes a monovalent organic group, together with a stabilizing monomer to form a stabilized initiator, where the stabilizing monomer is selected from the group consisting of 1,1-diphenylethylene, α-t-butylstyrene, α-iso-propylstyrene, and 1-methyl-1-mesityl ethylene, 1-cyclopentyl-1-phenylethylene, 1-naphthyl-1-phenylethylene, and 1-pyrrolidinyl-1-phenylethylene; and
  ii. reacting the stabilized initiator with anionically-polymerizable, conjugated diene monomer and optionally vinyl aromatic monomer.

8. The process of claim 7, where the anionically-polymerizable monomer includes both conjugated diene monomer and vinyl aromatic monomer.

9. The process of claim 7, where the conjugated diene monomer is selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene.

10. The process of claim 8, where the vinyl aromatic monomer is selected from the group consisting of vinyl-substituted aromatic compounds such as styrene, p-methylstyrene, α-methylstyrene, and vinylnaphthalene.

11. The process of claim 7, where the functional anionic initiator is selected from the group consisting of 2-lithio-2-methyl-1,3-dithiane, 2-lithio-2-phenyl-1,3-dithiane, 2-lithio-2-(4-dimethylamino)phenyl-1,3-dithiane, 2-lithio-2-trimethylsilyl-1,3-dithiane, and initiators selected from the group consisting of 2-lithio-2-phenyl-1,3-dithiane, 2-lithio-2-(4-dimethylaminophenyl)-1,3-dithiane, and 2-lithio-2-(4-dibutylaminophenyl)-1,3-dithiane, 2-lithio-[4-(4-methylpiperazino)]phenyl-1,3-dithiane, 2-lithio-[2-(4-methylpiperazino)]phenyl-1,3-dithiane, 2-lithio-[2-morpholino]phenyl-1,3-dithiane, 2-lithio-[4-morpholin-4-yl]phenyl-1,3-dithiane, 2-lithio-[2-morpholin-4-yl-pyridine-3]-1,3-dithiane, 2-lithio-[6-morpholin-4-pyridino-3]-1,3-dithiane, 2-lithio-[4-methyl-3,4-dihydro-2H-1,4-benzoxazine-7]-1,3-dithiane, and mixtures thereof.

12. A polymer defined by the formula

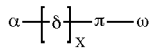

where α is the residue of a functional initiator defined by the formula

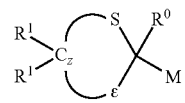

where each $R^1$ independently includes hydrogen or a monovalent organic group, $R^0$ includes a monovalent organic group, z is an integer from 1 to about 8, ε includes sulfur, oxygen, or tertiary amino, and M is a metal, x is an integer from 1 to 5, π is an anionically-polymerized polymer chain prepared by polymerizing conjugated diene monomer optionally together with vinyl aromatic monomer, ω is a terminal unit including a proton, a functional group, or a coupling moiety tethered to one or more additional polymer chains, and where δ is the polymerization product of stabilizing monomer selected from the group consisting of 1,1-diphenylethylene, α-t-butylstyrene, α-iso-propylstyrene, and 1-methyl-1-mesityl ethylene, 1-cyclopentyl-1-phenylethylene, 1-naphthyl-1-phenylethylene, and 1-pyrrolidinyl-1-phenylethylene.

13. The polymer of claim 12, where the functional head group reduces the 50° C. hysteresis loss of carbon-black filled vulcanizates prepared from the polymer as compared to carbon-black filled vulcanizates prepared from a polymer that does not include the functional group.

14. The polymer of claim 12, where the functional initiator is defined by the formula

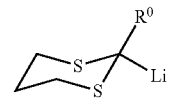

where $R^0$ includes a monovalent organic group.

15. A tire component comprising the vulcanized residue of a polymer defined by the formula

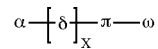

where α is the residue of a functional initiator defined by the formula

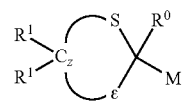

where each $R^1$ independently includes hydrogen or a monovalent organic group, $R^0$ includes a monovalent organic group, z is an integer from 1 to about 8, ε includes sulfur, oxygen, or tertiary amino, and M is a metal, x is an integer from 1 to 5, π is an anionically-polymerized polymer chain prepared by polymerizing conjugated diene monomer optionally together with vinyl aromatic monomer, ω is a terminal unit including a proton, a functional group, or a coupling moiety tethered to one or more additional polymer chains, and where δ is the polymerization product of stabilizing monomer selected from the group consisting of 1,1-diphenylethylene, α-t-butylstyrene, α-iso-propylstyrene, and 1-methyl-1-mesityl ethylene, 1-cyclopentyl-1-phenylethylene, 1-naphthyl-1-phenylethylene, and 1-pyrrolidinyl-1-phenylethylene.
16. The tire component of claim 15, where the functional initiator is defined by the formula
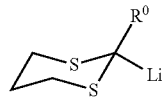
where $R^0$ includes a monovalent organic group.
* * * * *